United States Patent [19]
Kameyama

[11] Patent Number: 5,504,973
[45] Date of Patent: Apr. 9, 1996

[54] STOPPER STRUCTURE AND STOPPER MEMBER FOR PREVENTING A GROMMET FROM COMING OFF FROM A PANEL

[75] Inventor: Yasushi Kameyama, Hiroshima, Japan

[73] Assignee: Yazaki Corporation, Japan

[21] Appl. No.: 230,783

[22] Filed: Apr. 21, 1994

[30]  Foreign Application Priority Data

Apr. 22, 1993 [JP] Japan .................................. 5-095970

[51] Int. Cl.⁶ .................................................. F16L 5/00
[52] U.S. Cl. ........................................... 16/2; 174/153 G
[58] Field of Search ........................... 16/2, 3; 174/151, 174/152 R, 152 G, 153 R, 153 G; 217/113, 98, 106, 108; 248/56

[56]  References Cited

U.S. PATENT DOCUMENTS

| | | | |
|---|---|---|---|
| 2,188,596 | 1/1940 | Hobert | 16/2 |
| 3,836,269 | 9/1974 | Koscik | 16/2 |
| 3,889,909 | 6/1975 | Koscik | 248/56 |
| 3,967,050 | 6/1976 | Makihara et al. | 16/2 |
| 4,808,774 | 2/1989 | Crane | 174/153 G |
| 4,945,193 | 7/1990 | Oikawa et al. | 248/56 |
| 5,337,447 | 8/1994 | Tanaka et al. | 16/2 |

FOREIGN PATENT DOCUMENTS 1-130230  9/1989  Japan.

*Primary Examiner*—P. Austin Bradley
*Assistant Examiner*—Chuck Y. Mah
*Attorney, Agent, or Firm*—Wigman, Cohen, Leitner & Myers

[57]  ABSTRACT

A stopper structure for preventing a grommet made of elastic material from coming off from a panel, includes a stopper flange formed in the grommet. The stopper-structure further includes a stopper member made of rigid material, which includes an internal and an external circumferential ring fit in and on an internal and an external circumference of the stopper flange, respectively. The external circumferential ring is divided into two half elements which are connected with each other through a hinge. The internal circumferential ring is divided into two half elements which are connected to the half elements of the external circumferential ring, respectively.

9 Claims, 3 Drawing Sheets

STOPPER STRUCTURE AND STOPPER MEMBER FOR PREVENTING A GROMMET FROM COMING OFF FROM A PANEL

BACKGROUND OF THE INVENTION

This invention relates to a stopper structure and stopper member for preventing a grommet from coming off from a panel.

Generally, a grommet is integrally made from elastic material such as a rubber and formed with a fitting portion, on one side, to be fit in a through hole of a panel. The grommet is formed with an inserting portion for receiving a wire on the other side. The grommet is further formed with a stopper flange on an end of the fitting portion and the stopper flange has an outside diameter larger than the inside diameter of the through hole.

When mounting the grommet on the panel, the grommet is inserted Into the through hole of the panel from one side to the other side fitting the fitting portion in the through hole. Thus, the grommet is prevented from coming off from the through hole because the flange engages the inner peripheral edge of the through hole when a tension force is exerted to the grommet on the inserting portion side.

However, because the stopper flange is made from elastic material, when, for example, an oblique tension force is exerted to the grommet, the stopper flange is apt to be deformed resulting in the grommet coming off from the panel.

Therefore, to solve such a problem, the stopper flange is formed thickly, and alternately the stopper flange is formed with an annular groove at the internal circumference of the flange and a ring made of rigid material is fit into the annular groove (refer to Japanese Utility Model Laid Open No. 1-130230).

However, when making the stopper flange thick, processing costs and the weight of the grommet are increased. When forming the annular groove at the internal circumference of the flange and fitting the rigid ring into the annular groove, it is troublesome to mount and demount the ring, so that the operability when mounting and demounting the ring is poor.

SUMMARY OF THE INVENTION

It is an object of the present invention to provide a stopper structure and stopper member for preventing a grommet from coming off from a panel, in which there is no need to make the flange thick and which has good operability when mounting and demounting.

To accomplish this object, from a first aspect, the present invention provides a stopper structure for preventing a grommet made of elastic material from coming off from a panel, comprising:

a stopper flange formed in the grommet; and a stopper member made of rigid material, including an internal and an external circumferential ring fit in and on an internal and an external circumference of the stopper flange, respectively.

With this configuration, since the stopper ring is pinched by the internal circumferential ring and the external circumferential ring on inside and outside, the stopper flange is securely prevented from being deformed. In addition, since the stopper ring has the external circumferential ring, the stopper member can be supported at the external circumference of the flange. Consequently, there is no need to form an annular groove at the internal circumference of the flange and it is easy to mount and demount the internal circumferential ring.

From a second aspect, the present invention provides a stopper member for preventing a flange of a grommet made of elastic material from coming off from a panel, comprising:

an external circumferential ring made of rigid material, fitting on an external circumference of the flange, circumferentially divided into a plurality of elements which are connected with each other by an end thereof through a hinge in a freely pivotable manner, the other ends of the elements being formed with locking portions engaging each other; and an internal circumferential ring made of rigid material and integrally formed with the external circumferential ring fitting in an internal circumference of the flange, circumferentially divided into a plurality of elements which are connected to the elements of the external circumferential ring through a hinge.

With this configuration since the external circumferential ring is divided into a plurality of elements the external circumferential ring can be mounted on the external circumference of the stopper flange at an open state and then the locking portions engage each other. Thus, the external circumferential ring is easily mounted on the stopper flange. After the mounting of the external circumferential ring, by pivoting the elements of internal circumferential ring inwardly, the internal circumferential ring can be fit in the internal circumference of the stopper flange. Consequently, the mounting operation can be easily conducted. On the other hand, when demounting the stopper member, the elements of the internal circumferential ring is pivoted outwardly and then the external circumferential ring is disengaged from the stopper flange, and thus the stopper member can be easily demounted from the grommet.

DESCRIPTION OF THE PREFERRED EMBODIMENT

Figure 1:
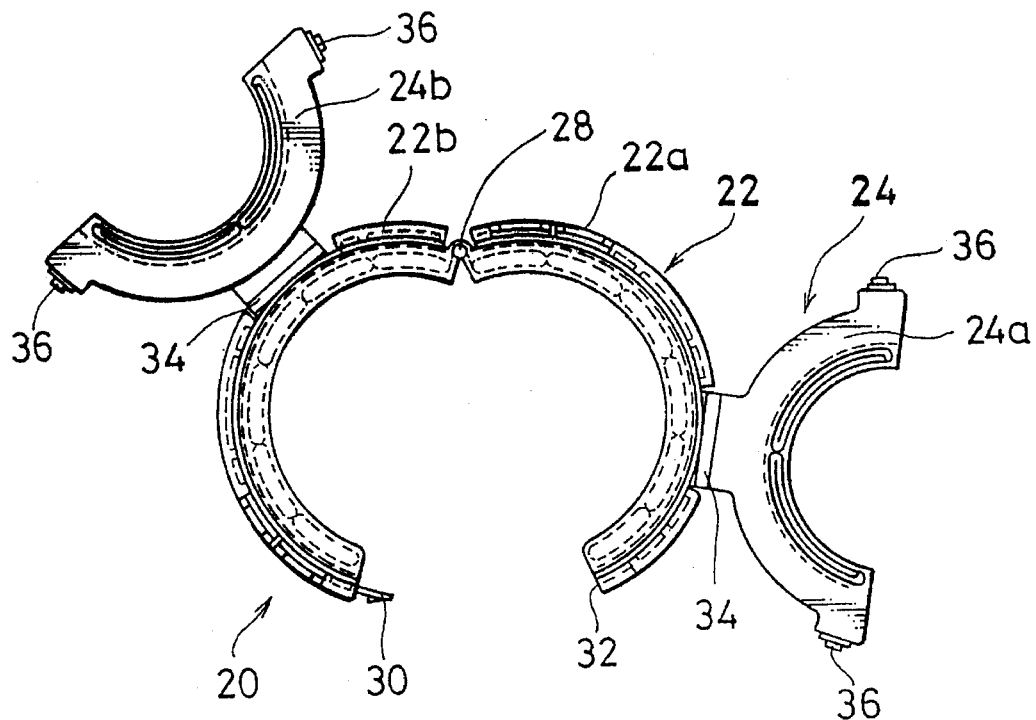
FIG. 1 is an expanded view showing a stopper member according to an embodiment of the present invention.
Figure 2:
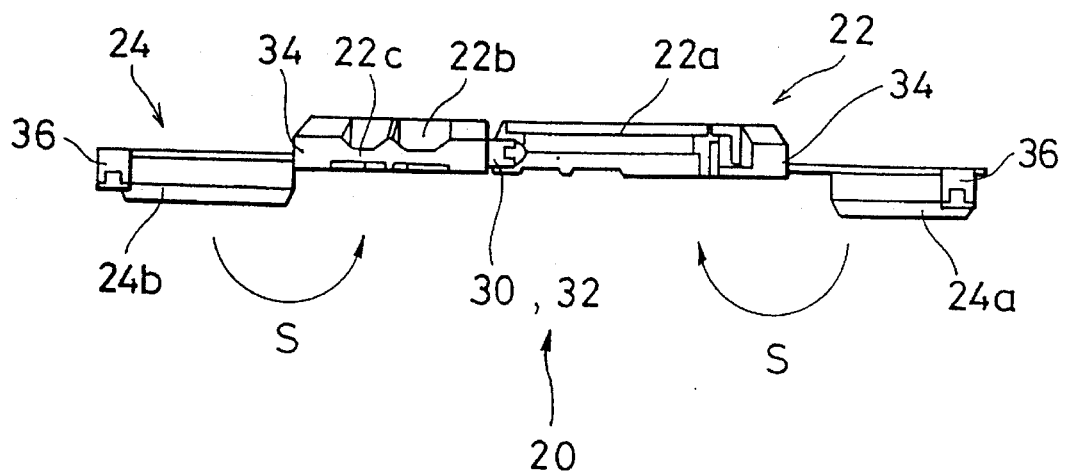
FIG. 2 is a side view showing the stopper member shown in FIG. 1.
Figure 3:
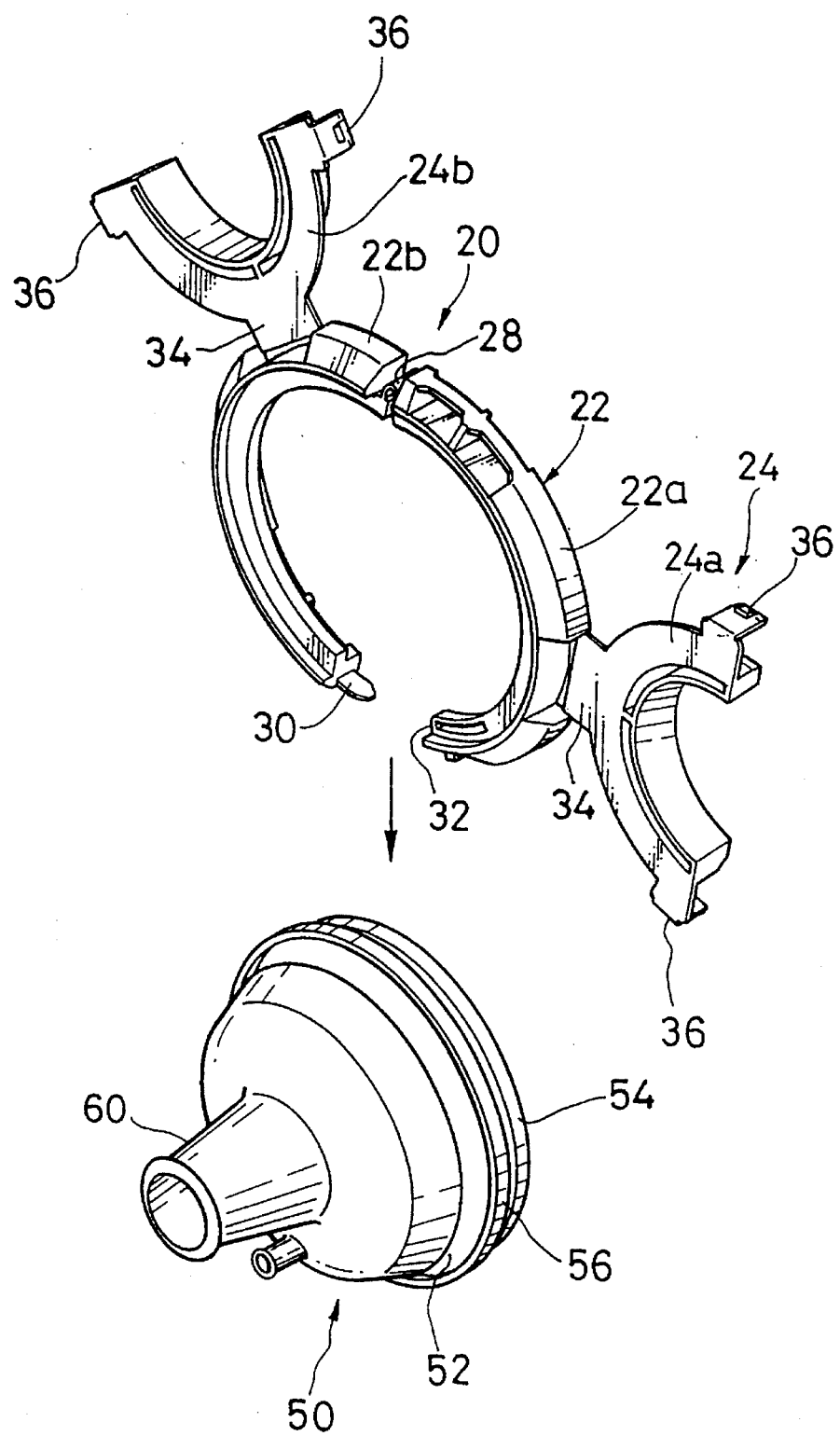
FIG. 3 is a perspective view showing the stopper member of FIG. 1 to be mounted on a grommet.
Figure 4:
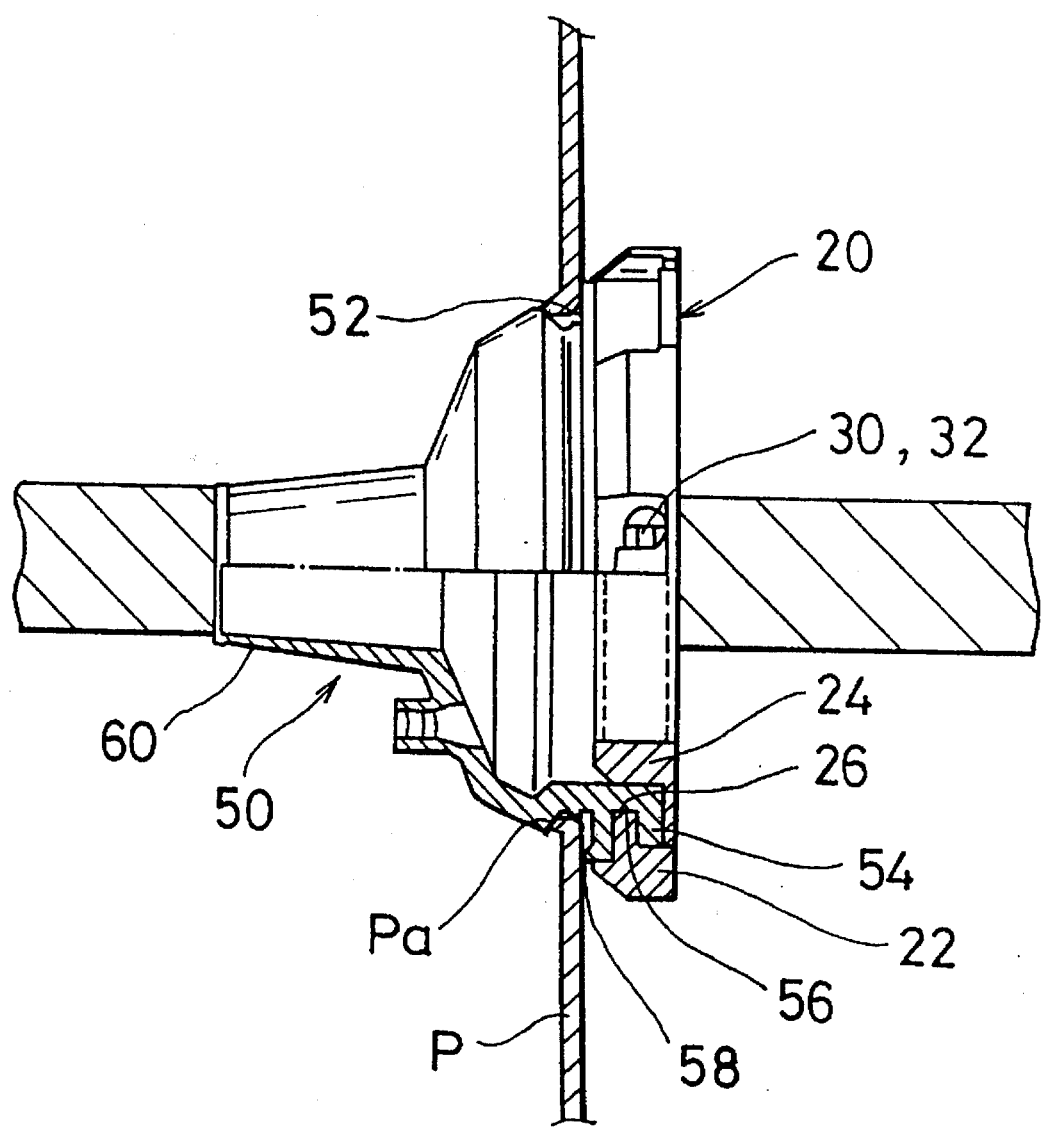
FIG. 4 is a cross sectional view showing a stopper structure, namely the stopper member of FIG. 1 mounted on a stopper flange of the grommet.

Referring to FIGS. 3 and 4, a grommet 50 is integrally made from elastic material and provided with a fitting portion 52 to be fit into a through hole Pa of a panel P and a stopper flange 54 for preventing the grommet from coming off from the stopper flange 54, and the flange 54 is formed next to the fitting portion 52. The stopper Flange 54 is formed with an annular groove 56 at the external circumferential surface thereof and a seal portion is 58 which comes into close contact with the panel P at the back face thereof. The grommet 50 is further formed with an inserting portion 60 for receiving a wire.

A stopper member 20 is provided with an external circumferential ring 22 to be fit onto the external circumference of the stopper flange 54 of the grommet 50 and an internal circumferential ring 24 to be fitted into the internal circumference of the stopper flange 54 of the grommet 50 as shown in FIGS. 1 to 4. The external circumferential ring 22 is integrally formed with the internal circumferential ring 24 from a rigid material. The external ring 22 is a short cylindrical member, and carries an annular projection 26 projecting inwardly from the internal circumferential surface thereof as shown in FIG. 4. The annular projection 26 is adapted to fit in the annular groove 56.

The external circumferential ring 22 is divided into two half elements 22a, 22b which are connected with each other at the ends thereof through a hinge 28 in a freely pivotable manner. The half elements 22a, 22b form the closed external circumferential ring 22 to engage engaging portions 30, 32 formed on the other ends thereof.

The internal circumferential ring 24 consists of an annular plate member and a cylindrical member 64 integrally formed with the plate member, and the cylindrical member 64 is adapted to be fit into the internal circumference of the stopper flange 54. The internal circumferential ring 24 is also divided into two half element 24a, 24b each of which is connected to the half elements 22a, 22b, respectively, though hinges 34. The half elements 24a, 24b can pivot on the hinge 34 to the internal circumference of the external circumferential ring 22, namely the half elements 24a, 24b can be folded as designated by an arrow S in FIG. 2. Each half elements 24a, 24b is formed with a lock portion 36, 36 at the external circumferential surface of both ends thereof, to engage an engaging portion 22c of the external circumferential ring 22 in a folded condition.

When mounting the stopper member 20 on the grommet 50, first the stopper member 20 is unfolded as shown in FIG. 3 and the annular projection 26 of the external circumferential ring 22 is inserted into the annular groove 56 of the grommet 50, with closing the half elements 22 and then the engaging portions 30, 32 are locked together. Next, the half elements 24a. 24b are folded inwardly to fit the cylindrical member into the internal circumference of the stopper flange 54. After that, the lock portions 36 engage the engaging portion 22c, thus the mounting is completed. When demounting the stopper member 20 from the grommet 50, the reverse operation is conducted.

Since the stopper member 20 is mounted on the stopper flange 54 by fitting the external circumferential ring 22 into the annular groove 56 formed in the stopper flange 54 at the middle portion thereof, the fitting portion 52 is free to be deformed when fitting in the panel P, thus the inserting characteristics to the panel P are improved.

Although one preferred embodiment of the present invention has been specifically described herein, it will be apparent to those skilled in the art to which the invention pertains that variations and modifications of that embodiment shown and described herein may be made without departing from the spirit and scope of the invention. Accordingly, it is intended that the invention be limited only to the extent required by the appended claims and the applicable rules of law.

What is claimed is:

1. A stopper structure for engaging with and preventing a grommet made of an elastic material having a stopper flange with an internal circumference and an external circumference from separating a panel to which the grommet is attached, the stopper structure comprising:

a stopper member made of rigid material, including an internal circumferential ring to be fitted to the internal circumference of said stopper flange and an external circumferential ring to be fitted to the external circumference of said stopper flange, said external circumferential ring opposing the internal circumferential ring said internal circumferential ring and said external circumferential ring having a substantially equal spacing therebetween along a circumferential extent of the stopper flange when said circumferential rings are fully engaged with the stopper flange.

2. A stopper structure according to claim 1, wherein said stopper flange is formed with an annular groove at an external circumference thereof, and said external circumferential ring is formed with an annular projection which is adapted to fit in said annular groove; said external circumferential ring being integrally formed with the internal circumferential ring.

3. A stopper structure according to claim 2, wherein said external circumferential ring is divided into two half elements which are connected with each other at opposing ends thereof by a hinge in a freely pivotable manner and each of the other opposing ends thereof are formed with locking portions to engage each other; said internal circumferential ring being divided into two half elements each of which is connected to one said half element of said external circumferential ring with a hinge each of said half elements of said internal circumferential ring being formed with engaging projections to be engaged with engaging portions of said external circumferential ring.

4. A stopper structure according to claim 2, wherein said external circumferential ring is divided into two elements which are connected with each other at opposing ends thereof by a hinge, and each of the other opposing ends thereof are formed with engaging portions to engage each other; said internal circumferential ring being divided into two elements each of which is connected to one of the divided elements of said external circumferential ring with a hinge; wherein each of said divided elements of said internal circumferential ring includes an engaging projection to be engaged with a corresponding engaging portion of said external circumferential ring.

5. A stopper structure according to claim 1, wherein said internal circumferential ring and said external circumferential ring have a substantially parallel spacing therebetween along the circumferential extent of the stopper flange when said circumferential rings fully engage with the stopper flange.

6. A stopper structure according to claim 1, wherein the internal circumferential ring includes a cylindrical member having an outer circumference shaped complementary to the inner circumference of the stopper flange.

7. A stopper member for preventing a flange of a grommet made of elastic material from separating from a panel, comprising:

an external circumferential ring made of rigid material external circumference of the flange, said circumferential ring being circumferentially divided into a plurality of elements having opposing ends connected to each other by a hinge in a freely pivotable manner, the other ends of said elements being formed with locking portions for engaging each other; and an internal circumferential ring made of rigid material and integrally formed with said external circumferential ring, fitting in an internal circumference of the flange, circumferentially divided into a plurality of elements each of which is connected to said elements of said external circumferential ring through a hinge, respectively.

8. A stopper member according to claim 7, wherein said external circumferential ring is formed at the internal circumference thereof with an annular projection to be fitted in an outer annular groove of the flange.

9. A stopper member according to claim 7, wherein each of said elements of said external circumferential ring is formed with engaging portions and each of said elements of said internal circumferential ring is formed with engaging projections to engage said engaging portions.

* * * * *

UNITED STATES PATENT AND TRADEMARK OFFICE
CERTIFICATE OF CORRECTION

PATENT NO. : 5,504,973
DATED : April 9, 1996
INVENTOR(S) : Yasushi Kameyama

It is certified that error appears in the above-indentified patent and that said Letters Patent is hereby corrected as shown below:

Claim 7, column 4, line 52, "to be fitted to an" should be insert after "material"

Signed and Sealed this

Sixteenth Day of July, 1996

Attest:

BRUCE LEHMAN

*Attesting Officer*     *Commissioner of Patents and Trademarks*